United States Patent
Mullett (10) Patent No.: US 9,934,632 B2
(45) Date of Patent: Apr. 3, 2018

(54) WIRELESS PASSENGER PROXIMITY DETECTION SYSTEM FOR AUTONOMOUS VEHICLES

(71) Applicant: DENSO International America, Inc., Southfield, MI (US)

(72) Inventor: Reilly Patrick Mullett, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/257,558

(22) Filed: Sep. 6, 2016

(65) Prior Publication Data

US 2018/0068505 A1  Mar. 8, 2018

(51) Int. Cl.
*G07C 9/00* (2006.01)
*G05D 1/00* (2006.01)
*H04W 4/00* (2018.01)

(52) U.S. Cl.
CPC ........ *G07C 9/00111* (2013.01); *G05D 1/0088* (2013.01); *G07C 9/00119* (2013.01); *H04W 4/008* (2013.01); *G07C 2009/00206* (2013.01)

(58) Field of Classification Search
CPC ...... G07C 9/00309; G07C 2009/00793; G07C 9/00182; G07C 2209/63; G07C 9/00944; G07C 2209/64; G07C 9/00111; G07C 9/00126
USPC ....................................................... 340/5.72
See application file for complete search history.

(56) References Cited

U.S. PATENT DOCUMENTS

| | | | |
|---|---|---|---|
| 8,299,894 B1 * | 10/2012 | Semeniuk | 307/10.2 |
| 8,943,187 B1 * | 1/2015 | Saylor | H04L 67/306 |
| | | | 709/223 |
| 9,276,736 B2 * | 3/2016 | Peirce | H04L 9/0819 |
| 9,276,737 B2 * | 3/2016 | Peirce | H04L 9/0819 |
| 9,323,546 B2 * | 4/2016 | Rork | G06F 8/65 |
| 9,369,871 B2 * | 6/2016 | Hernandez | H04W 12/08 |
| 9,424,451 B2 * | 8/2016 | Kalhous | G06K 7/10366 |
| 2005/0035882 A1 | 2/2005 | Vassallo | |
| 2005/0242923 A1 | 11/2005 | Pearson et al. | |
| 2011/0137520 A1 | 6/2011 | Rector et al. | |
| 2015/0166009 A1 | 6/2015 | Outwater et al. | |

* cited by examiner

*Primary Examiner* — Mark Blouin
(74) *Attorney, Agent, or Firm* — Harness, Dickey & Pierce, P.L.C.

(57) ABSTRACT

A system and method are provided and include a controller that controls a door lock actuator system of an autonomous vehicle. The controller is configured to receive a request for transportation from a server in communication with a smartphone. The request for transportation includes a pickup location and a unique identifier. The controller is configured to store the unique identifier received from the server as a stored unique identifier, to communicate directly with the smartphone, to receive a smartphone unique identifier from the smartphone, to compare the smartphone unique identifier with the stored unique identifier, and to control the door lock actuator system to unlock and/or open at least one door of the autonomous vehicle when the smartphone unique identifier matches the stored unique identifier.

20 Claims, 4 Drawing Sheets

WIRELESS PASSENGER PROXIMITY DETECTION SYSTEM FOR AUTONOMOUS VEHICLES

FIELD

The present disclosure relates to systems and methods for wireless passenger proximity detection for autonomous vehicles and, in particular, to systems and methods for wireless passenger proximity detection for autonomous vehicles that detect and recognize a computing device, such as a smartphone, of a passenger that is near the autonomous vehicle.

BACKGROUND

This section provides background information related to the present disclosure, which is not necessarily prior art.

Systems exist for autonomous or self-driving vehicles, which can be used as a form of public or shared transportation. For example, a passenger may be able to use a computing device, such as a smartphone, to request that an autonomous or self-driving vehicle pick up the passenger at a designated location and transport the passenger to a designated destination. Once the autonomous or self-driving vehicle arrives at the pickup location, however, such systems may not be able to recognize and confirm the identity of the particular passenger that requested transportation.

SUMMARY

This section provides a general summary of the disclosure, and is not a comprehensive disclosure of its full scope or all of its features.

The present teachings include systems and methods for wireless passenger proximity detection for autonomous vehicles The present teachings include a system comprising a controller that controls a door lock actuator system of an autonomous vehicle. The controller is configured to receive a request for transportation from a server in communication with a smartphone. The request for transportation includes a pickup location and a unique identifier. The controller is configured to store the unique identifier received from the server as a stored unique identifier, to communicate directly with the smartphone, to receive a smartphone unique identifier from the smartphone, to compare the smartphone unique identifier with the stored unique identifier, and to control the door lock actuator system to unlock and/or open at least one door of the autonomous vehicle when the smartphone unique identifier matches the stored unique identifier.

The present teachings also include a method. The method includes receiving, with a controller of an autonomous vehicle, a request for transportation from a server in communication with a smartphone. The request for transportation including a pickup location and a unique identifier. The method also includes storing, with the controller, the unique identifier received from the server as a stored unique identifier in a memory accessible to the controller. The method also includes communicating, with the controller, directly with the smartphone to receive a smartphone unique identifier from the smartphone. The method also includes comparing, with the controller, the smartphone unique identifier with the stored unique identifier. The method also includes controlling, with the controller, a door lock actuator system to unlock and/or open at least one door of the autonomous vehicle when the smartphone unique identifier matches the stored unique identifier.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present teachings include systems and methods for wireless passenger proximity detection for autonomous vehicles. For example, the present teachings include detecting a passenger's smartphone when arriving at a passenger pickup location. The autonomous vehicle, for example, can receive unique identification information for smartphones or other computing devices that are nearby the designated passenger pickup location and can compare the received unique identification information with unique identification information received at the time the autonomous vehicle was requested for transportation. Once the autonomous vehicle matches/recognizes the received unique identification information from a smartphone at the passenger pickup location, based on the comparison, the autonomous vehicle can unlock and/or open the doors of the autonomous vehicle to allow the verified passenger to enter the autonomous vehicle.

Figure 1:
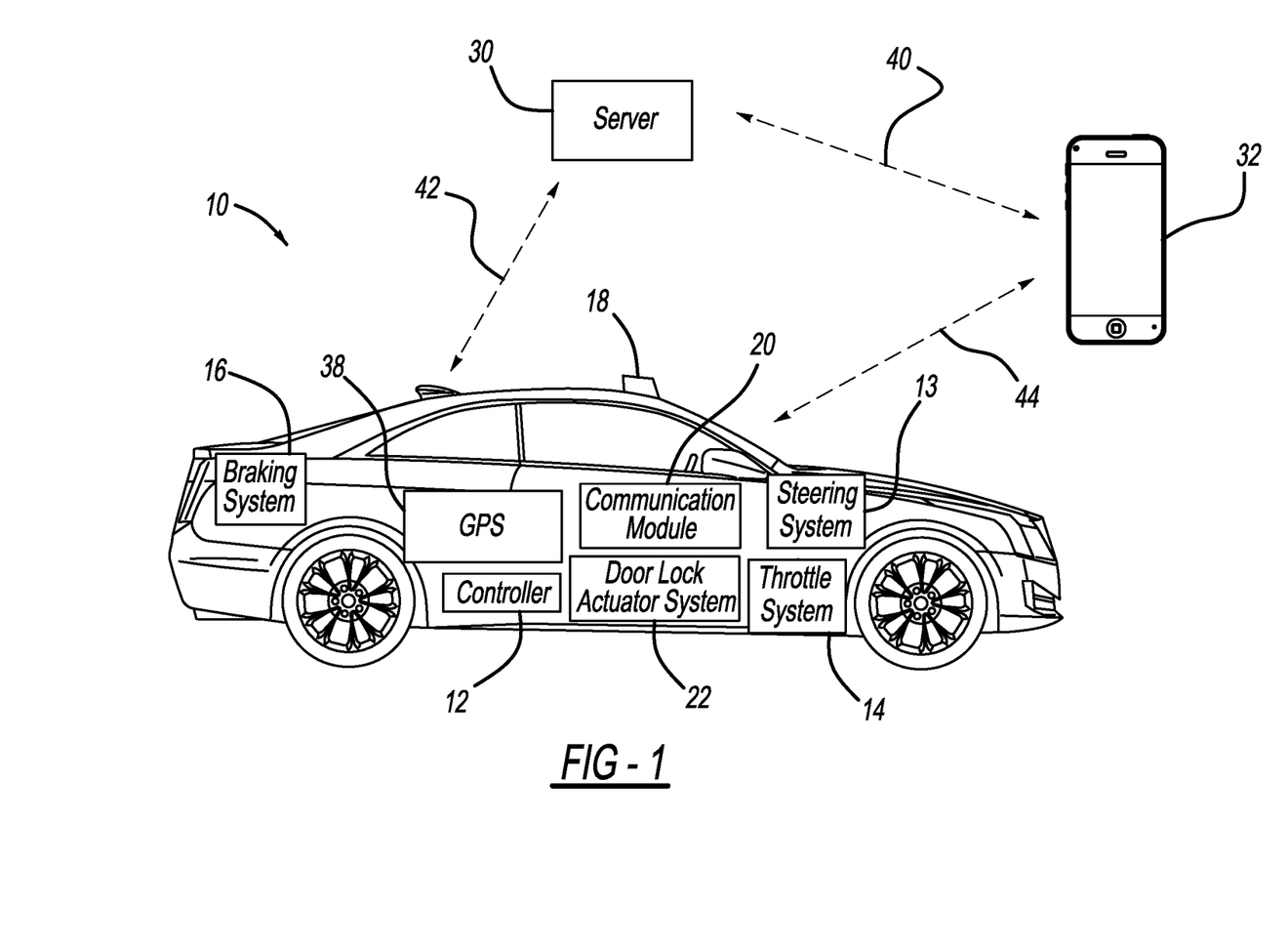
FIG. 1 illustrates an autonomous vehicle according to the present teachings.

With reference to FIG. 1, an autonomous vehicle 10 is illustrated and includes a controller 12, a steering system 13, a throttle system 14, a braking system 16, a communication module 20, a door lock actuator system 22, and a global positioning system (GPS) 38.

The autonomous vehicle 10 also includes one or more environmental sensors 18 to sense information about the surroundings of the autonomous vehicle 10. For example, the environmental sensors 18 may include an image sensor, such as a camera, mounted to a roof, a windshield, and/or other locations of the autonomous vehicle 10. Additionally, the environmental sensors 18 may include a Lidar sensor, a radar sensor, an ultrasonic sensor, or other sensors for detecting information about the surroundings of the autonomous vehicle 10, including, for example, other vehicles, lane lines, guard rails, objects in the roadway, buildings, pedestrians, etc., While the environmental sensors 18 are shown in FIG. 1 as a single entity, additional environmental sensors may be located on or around the autonomous vehicle 10. For example, the autonomous vehicle 10 may include a rear-facing sensor for sensing objects behind the autonomous vehicle 10.

The controller 12 receives data about the surroundings of the autonomous vehicle 10 from the environmental sensors 18 and the GPS 38 and uses the received data for driving the autonomous vehicle 10. For example, the controller 12 uses the received data to control the steering system 13, the throttle system 14, and the braking system 16 to drive the vehicle to a particular location. For example, the location may be a pickup location to pick up a passenger that has requested transportation via the autonomous vehicle 10 through a smartphone 32 running a smartphone application that communicates with a server 30 that, in turn, communicates with the controller 12 of the autonomous vehicle 10 using the communication module 20.

Figure 2A:
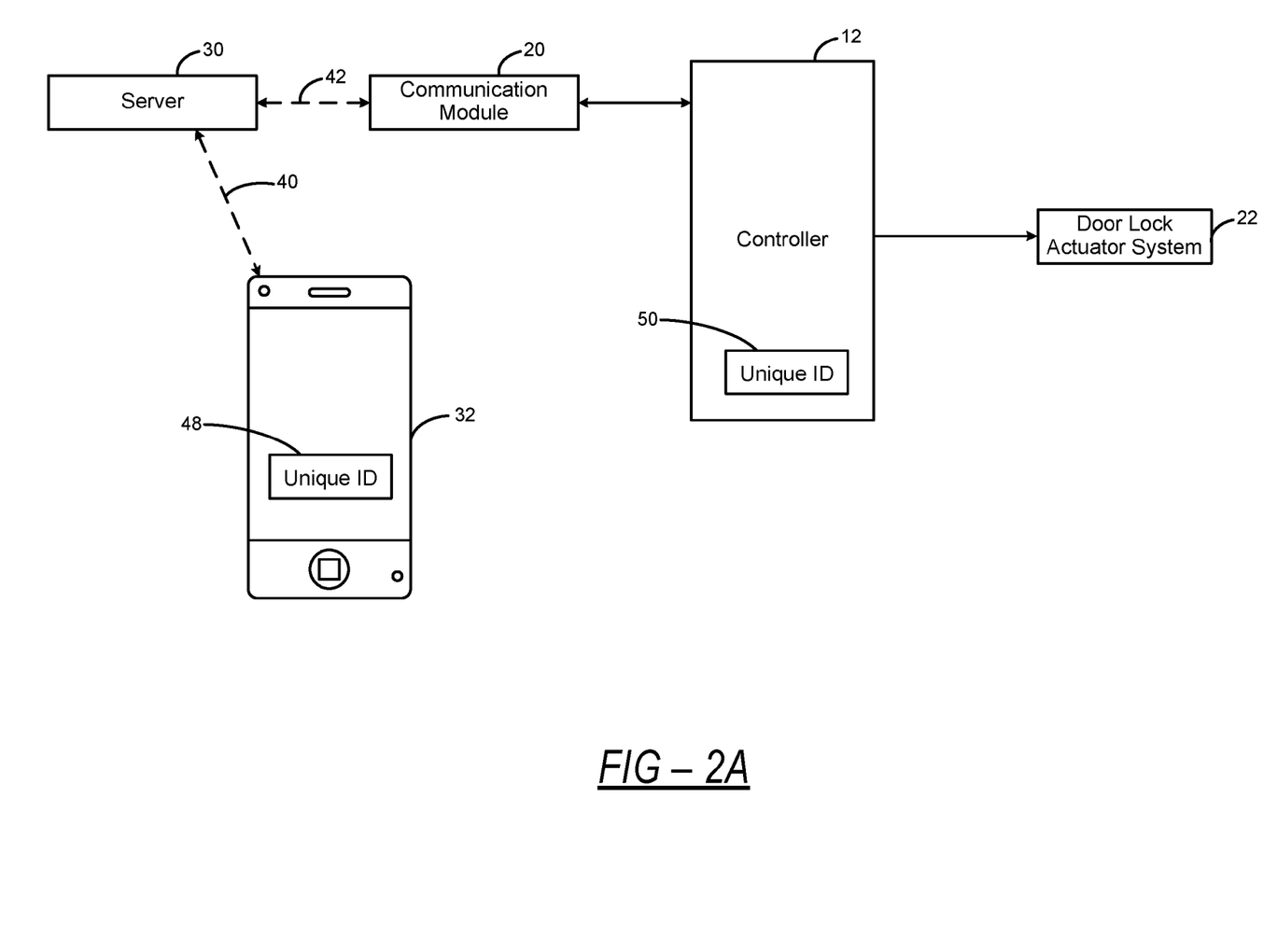
FIGS. 2A and 2B illustrate a block diagram of a wireless passenger proximity detection system for an autonomous vehicle according to the present teachings.

As shown in FIGS. 1 and 2A, line 40 illustrates a wireless communication link between the smartphone 32 and the server 30 while line 42 illustrates a wireless communication link between the server 30 and the controller 12 of the autonomous vehicle 10. As mentioned above, the server 30 communicates with the controller 12 through the communication module 20. The smartphone 32 may communicate with the server 30 over the Internet using a WiFi network or a cellular data network, such as an LTE, 4G, or 3G network. Similarly, the server 30 may communicate with the communication module 20 of the autonomous vehicle 10 over the Internet using a WiFi network or a cellular data network, such as an LTE, 4G, or 3G network. Additionally or alternatively, the server 30 may communicate with the communication module 20 of the autonomous vehicle 10 using a satellite communication link or any other suitable communication link.

A passenger may use the smartphone 32 and a smartphone application running on the smartphone to request transportation via the autonomous vehicle 10. For example, the passenger may input, using the smartphone application, a particular destination that the passenger would like to be transported to. While a smartphone 32 is shown and discussed, other computing devices, such as a tablet, laptop, or other computing device, could also be used. Once the passenger has inputted the particular destination, the smartphone application running on the smartphone 32 communicates the request for transportation, including the inputted destination, the current location of the passenger, and unique identification information associated with the smartphone 32 to the server 30. The smartphone application may determine the current location of the passenger using a GPS service of the smartphone 32. The current location of the passenger, for example, is communicated to the server 30 as a pickup location for the passenger. Alternatively, the passenger may input a particular pickup location that the passenger will be at for pickup.

The smartphone 32 stores the unique identification information, also referred to as a unique identifier or unique ID 48 (shown in FIGS. 2A and 2B) in a memory, such as a non-volatile memory, of the smartphone 32. The unique ID 48 serves as a fingerprint for the smartphone 32 as it is uniquely associated with that particular smartphone 32. The unique ID 48 may, for example, be a media access control address or MAC address uniquely associated with the smartphone 32. Additionally or alternatively, the unique ID 48 may be assigned to the smartphone 32 by the server 30 for purposes of locating the smartphone and the passenger while using the smartphone application.

The server 30 receives the request for transportation and the unique ID 48 from the smartphone application running on the smartphone 32 and communicates the pickup location and the unique ID 48 to the autonomous vehicle 10. The controller 12 of the autonomous vehicle 10 receives the pickup location and the unique ID 48 from the server 30 through the communication module 20. The controller 12 stores the unique ID 48 in a memory accessible to the controller 12 as a stored unique ID 50 (shown in FIGS. 2A and 2B). Further, the controller 12 controls the steering system 13, the throttle system 14, and the braking system 16 to drive the autonomous vehicle 10 to the pickup location to pick up the passenger.

Figure 2B:
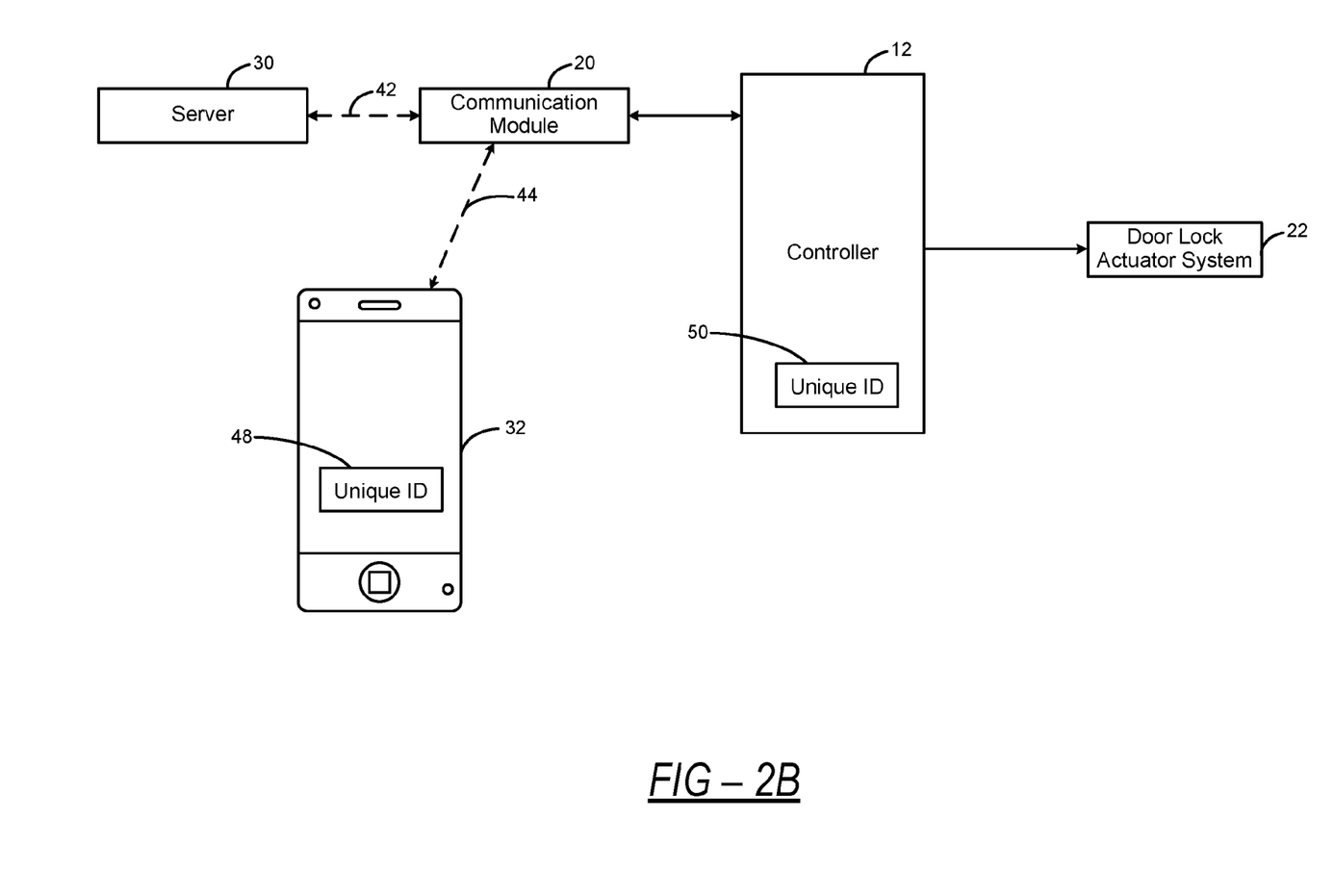

Once the autonomous vehicle 10 has arrived at the pickup location, the controller 12 uses the communication module 20 to search for communicating computing devices, such as smartphone(s) 32, that are within direct communication range of the autonomous vehicle 10. For example, the controller 12 may control the communication module 20 to search for computing devices, such as smartphone(s) 32, that are communicating using a wireless personal area network (WPAN) in the area of the autonomous vehicle 10. For example, the controller 12 may search for computing devices that are communicating with a BLUETOOTH® or other suitable WPAN connection and that are within communication range of the communication module 20 and the autonomous vehicle 10. With reference to FIG. 1 and FIG. 2B, the direct wireless communication link between the autonomous vehicle 10 and the smartphone 32 is shown as line 44.

Once the controller 12 identifies a smartphone 32, within communicating range of the autonomous vehicle 10, the controller 12 can communicate directly with the smartphone 32 to request, retrieve, and/or determine the unique ID 48 of the smartphone 32. For example, the controller 12 may receive a communication packet from the smartphone 32 that includes the unique ID 48 of the smartphone 32. Additionally or alternatively, the controller 12 may establish communication with the smartphone 32 and request that the smartphone 32 provide its unique ID 48 to the controller 12.

Once the controller 12 receives a unique ID 48 for a smartphone 32 in the area of the pickup location, the controller 12 compares the received unique ID 48 for the nearby smartphone 32 with the stored unique ID 50, previously received from the server 30 and now stored in the memory accessible to the controller 12. When the received unique ID 48 for the nearby smartphone 32 matches the stored unique ID 50, the controller 12 has confirmed that the smartphone 32 of the passenger that requested transportation is nearby the autonomous vehicle 10. In such case, the controller 12 can control the door lock actuator system 22 to unlock the doors of the autonomous vehicle 10 and/or to open the doors of the autonomous vehicle 10 to allow the verified passenger to enter the autonomous vehicle 10. When, on the other hand, the received unique ID 48 for the nearby smartphone 32 does not match the stored unique ID 50, the controller 12 continues to search for communicating computing devices, such as smartphone(s) 32, in the vicinity. In other words, when the received unique ID 48 for the nearby smartphone 32 does not match the stored unique ID 50, the controller 12 has not yet found the smartphone 32 of the passenger that requested transportation and continues to scan the area looking for the smartphone 32 the correct unique ID 48 that matches the stored unique ID 50.

The autonomous vehicle 10 may include one or more passenger detection sensors to detect whether passengers are present in the autonomous vehicle 10. In this way, once the controller 12 has controlled the door lock actuator system 22 to unlock the doors of the autonomous vehicle 10 and/or to open the doors of the autonomous vehicle 10, the controller 12 can determine, based on the data from the one or more passenger detection sensors that passenger(s) have entered the vehicle. Additionally or alternatively, the controller 12 can determine that passenger(s) have entered the vehicle based on the vehicle request control logic. For example, the controller 12 can determine that passenger(s) have entered the autonomous vehicle 10 once the autonomous vehicle 10 has arrived at the pickup location and the doors of the autonomous vehicle 10 have been opened and then closed.

Once the autonomous vehicle 10 matches the unique ID 48 of the smartphone 32 with the stored unique ID 50 and verified the correct passenger, the smartphone 32 then communicates directly with the autonomous vehicle 10 using the direct wireless communication link from the smartphone 32 to the controller 12 through the communication module 20, shown as line 44 in FIGS. 1 and 2B.

With reference to FIGS. 2A and 2B, communication between the smartphone 32, the server 30, and the communication module 20 are shown both before and after a communication handoff. For example, in FIG. 2A before the communication handoff, the smartphone 32 is shown communicating with the server over the communication link shown by line 40. The server 30, in turn, communicates with the communication module 20 over the communication link shown by line 42. The controller 12 communicates with the communication module 20. With reference to FIG. 2B, after the communication handoff, the smartphone 32 communicates directly with the communication module 20 over the communication link shown by line 44.

Further, as shown in FIGS. 2A and 2B, the controller 12 controls the door lock actuator system 22, once the controller 12 verifies that the unique ID 48 of the smartphone 32 matches the stored unique ID 50, the controller 12 controls the door lock actuator system 22 to unlock the doors of the autonomous vehicle 10 and/or to open the doors of the autonomous vehicle 10 to allow the verified passenger(s) to enter the autonomous vehicle 10 for transportation to a designated destination.

Figure 3:
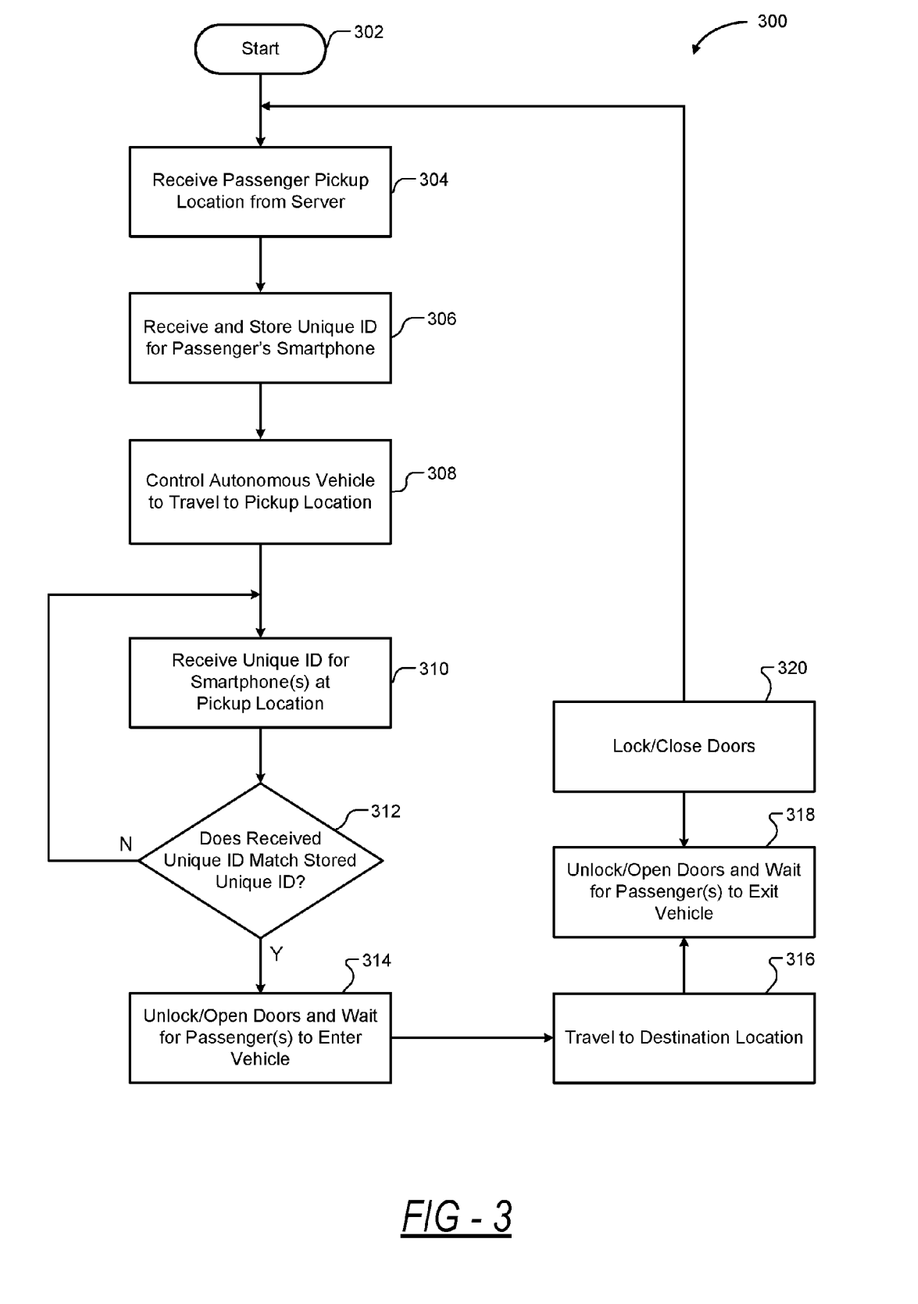
FIG. 3 illustrates a method for wireless passenger proximity detection for an autonomous vehicle according to the present teachings.

With reference to FIG. 3, a flow diagram of a method 300 for wireless proximity detection for autonomous vehicles according to the present teachings is illustrated. The method 300 can be performed by the controller 12 of the autonomous vehicle 10 and begins at 302. At 304, the controller 12 receives a request for passenger pickup at a particular passenger pickup location from the smartphone 32 of the passenger through communication with the server 30. The request may also include a designated destination, as inputted by the passenger.

At 306, the controller 12 receives the unique ID 48 from the smartphone 32 through communication with the server 30. At 306, the controller 12 also stores the unique ID 48, received from the smartphone 32, as the stored unique ID 50 in the memory accessible to the controller 12.

At 308, the controller 12 controls the autonomous vehicle to travel to the designated passenger pickup location.

At 310, once the autonomous vehicle 10 arrives at the pickup location, the controller 12 uses the communication module 20 to search for and receive the unique ID 48 for any smartphone(s) in the vicinity and within direct communication range of the autonomous vehicle 10. As discussed above, the controller 12 may control the communication module 20 to search for computing devices, such as smartphones, that are communicating using a WPAN network connection, such as a BLUETOOTH® or other suitable WPAN connection, in the area of the autonomous vehicle 10. With reference to FIGS. 1 and 2B, the direct wireless communication link between the autonomous vehicle 10 and the smartphone 32 is shown as line 44.

At 312, the controller 12 compares the received unique ID 48 from the smartphone 32 with the previously stored unique ID 50 that is stored in the memory accessible to the controller 12. At 312, when the received unique ID 48 from the smartphone 32 matches the previously stored unique ID 50, the controller 12 has confirmed and identified the correct smartphone 32 and passenger at the pickup location and proceeds to 314. At 312, when the received unique ID 48 from the smartphone 32 does not match the previously stored unique ID 50, the controller 12 loops back to 310 and continues to search for and receive the unique ID 48 for any smartphone(s) 32 in the vicinity and within direct communication range of the autonomous vehicle 10. In this way, the controller 12 continues to search and communicate with smartphone(s) 32 within direct communication range of the autonomous vehicle 10 until the correct smartphone 32 with a matching unique ID 48 is found.

At 314, once the correct smartphone 32 with the matching unique ID is found, the controller 12 controls the door lock actuator system 22 to unlock the doors of the autonomous vehicle 10 and/or to open the doors of the autonomous vehicle 10 to allow the passenger(s) to enter the autonomous vehicle 10 for transport. At 314, the controller 12 also waits for the passenger(s) to enter the autonomous vehicle 10. As discussed above, the autonomous vehicle 10 may include one or more passenger detection sensors to detect whether passengers are present in the autonomous vehicle 10. In this way, the controller 12 can determine, based on the data from the one or more passenger detection sensors that passenger(s) have entered the vehicle. Additionally or alternatively, the controller 12 can determine that passenger(s) have entered the vehicle based on the vehicle request control logic. For example, the controller 12 can determine that passenger(s) have entered the autonomous vehicle 10 once the autonomous vehicle 10 has arrived at the pickup location and the doors of the autonomous vehicle 10 have been opened and closed.

Once the passenger(s) have entered the autonomous vehicle 10, the controller 12 proceeds to 316 and travels to the designated destination location.

At 318, once the autonomous vehicle 10 has arrived at the destination location, the autonomous vehicle 10 unlocks and/or opens the doors of the autonomous vehicle 10 and waits for the passenger(s) to exit the autonomous vehicle 10. For example, the controller can determine, based on data from the one or more passenger detection sensors, that the passenger(s) have exited the vehicle. Additionally or alternatively, the controller 12 can determine that passenger(s) have exited the vehicle based on the doors of the autonomous vehicle 10 having been opened and then closed.

At 320, once the passenger(s) have exited the autonomous vehicle 10, the controller 12 locks and/or closes the doors of the autonomous vehicle. The controller 12 then loops back to 304 and waits for the next passenger pickup request from the server 30.

In this application, including the definitions below, the terms "module," "controller," control module," and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the modules, controllers, control modules, and systems described herein. In addition, in this application the terms "module," "controller," or "control module" may be replaced with the term "circuit."

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
   a controller that controls a door lock actuator system of an autonomous vehicle, the controller being configured to (i) receive a request for transportation from a server, the request for transportation including a pickup location and a first smartphone unique identifier, (ii) to store the first smartphone unique identifier received from the server, (iii) to search for smartphones in a wireless communication range of the autonomous vehicle in response to the autonomous vehicle arriving at the pickup location, (iv) to receive a second smartphone unique identifier from a smartphone at the pickup location via a direct wireless communication link with the smartphone, (v) to compare the second smartphone unique identifier with the stored first smartphone unique identifier, and (vi) to control the door lock actuator system to unlock and/or open at least one door of the autonomous vehicle in response to the second smartphone unique identifier matching the stored first smartphone unique identifier.

2. The system of claim 1, wherein the controller continues to search for additional smartphones when the second smartphone unique identifier does not match the stored first smartphone unique identifier.

3. The system of claim 1, wherein the controller communicates with the smartphone using a wireless personal area network.

4. The system of claim 1, wherein the controller receives a communication packet from the smartphone that includes the second smartphone unique identifier.

5. The system of claim 1, wherein the controller establishes communication with the smartphone and requests that the smartphone provide the second smartphone unique identifier.

6. The system of claim 1, wherein the controller controls the door lock actuator system to unlock at least one door of the autonomous vehicle when the second smartphone unique identifier matches the stored first smartphone unique identifier.

7. The system of claim 1, wherein the controller controls the door lock actuator system to open at least one door of the autonomous vehicle when the second smartphone unique identifier matches the stored first smartphone unique identifier.

8. A method comprising:
   receiving, with a controller of an autonomous vehicle, a request for transportation from a server, the request for transportation including a pickup location and a first smartphone unique identifier;

storing, with the controller, the first smartphone unique identifier received from the server in a memory accessible to the controller;

searching, with the controller, for smartphones in a wireless communication range of the autonomous vehicle in response to the autonomous vehicle arriving at the pickup location;

receiving, with the controller, a second smartphone unique identifier from a smartphone at the pickup location via a direct wireless communication link with the smartphone;

comparing, with the controller, the second smartphone unique identifier with the stored first smartphone unique identifier; and controlling, with the controller, a door lock actuator system to unlock and/or open at least one door of the autonomous vehicle in response to the second smartphone unique identifier matching the stored first smartphone unique identifier.

9. The method of claim 8, further comprising continuing to search, with the controller, for additional smartphones when the second smartphone unique identifier does not match the stored first smartphone unique identifier.

10. The method of claim 8, wherein the controller communicates with the smartphone using a wireless personal area network.

11. The method of claim 8, wherein the controller receives a communication packet from the smartphone that includes the second smartphone unique identifier.

12. The method of claim 8, wherein the controller establishes communication with the smartphone and requests that the smartphone provide the second smartphone unique identifier.

13. The method of claim 8, wherein the controller controls the door lock actuator system to unlock at least one door of the autonomous vehicle when the second smartphone unique identifier matches the stored first smartphone unique identifier.

14. The method of claim 8, wherein the controller controls the door lock actuator system to open at least one door of the autonomous vehicle when the second smartphone unique identifier matches the stored first smartphone unique identifier.

15. A system comprising:
an autonomous vehicle;
a door lock actuator system that controls locking and unlocking of at least one door of the autonomous vehicle; and
a controller configured to (i) receive a request for transportation from a server, the request for transportation including a pickup location and a first smartphone unique identifier received by the server from a smartphone, (ii) to store the first smartphone unique identifier received from the server as a stored smartphone unique identifier, (iii) to search for the smartphone in a wireless communication range of the autonomous vehicle in response to the autonomous vehicle arriving at the pickup location, (iv) to receive the first smartphone unique identifier from the smartphone at the pickup location via at least one direct wireless communication link with the smartphone, (v) to compare the first smartphone unique identifier with the stored smartphone unique identifier, and (vi) to control the door lock actuator system to unlock and/or open at least one door of the autonomous vehicle in response to the first smartphone unique identifier matching the stored smartphone unique identifier.

16. The system of claim 15, wherein the controller is configured to communicate with the smartphone using a wireless personal area network.

17. The system of claim 15, wherein the controller is configured to receive a communication packet from the smartphone that includes the first smartphone unique identifier.

18. The system of claim 15, wherein the controller is configured to establish communication with the smartphone and then request that the smartphone provide the first smartphone unique identifier.

19. The system of claim 15, wherein the controller is configured to control the door lock actuator system to unlock at least one door of the autonomous vehicle in response to the first smartphone unique identifier matching the stored smartphone unique identifier.

20. The system of claim 15, wherein the controller is configured to control the door lock actuator system to open at least one door of the autonomous vehicle in response to the first smartphone unique identifier matching the stored smartphone unique identifier.

* * * * *

UNITED STATES PATENT AND TRADEMARK OFFICE
CERTIFICATE OF CORRECTION

PATENT NO. : 9,934,632 B2
APPLICATION NO. : 15/257558
DATED : April 3, 2018
INVENTOR(S) : Mullett Page 1 of 1

It is certified that error appears in the above-identified patent and that said Letters Patent is hereby corrected as shown below:

Column 8, Claim 1, Line 24, after "identifier,", delete "¶"

Signed and Sealed this
Fourteenth Day of August, 2018

Andrei Iancu
*Director of the United States Patent and Trademark Office*